Aug. 8, 1939.    S. W. FERRIS    2,168,330
PURIFICATION OF WAXES
Filed May 8, 1935
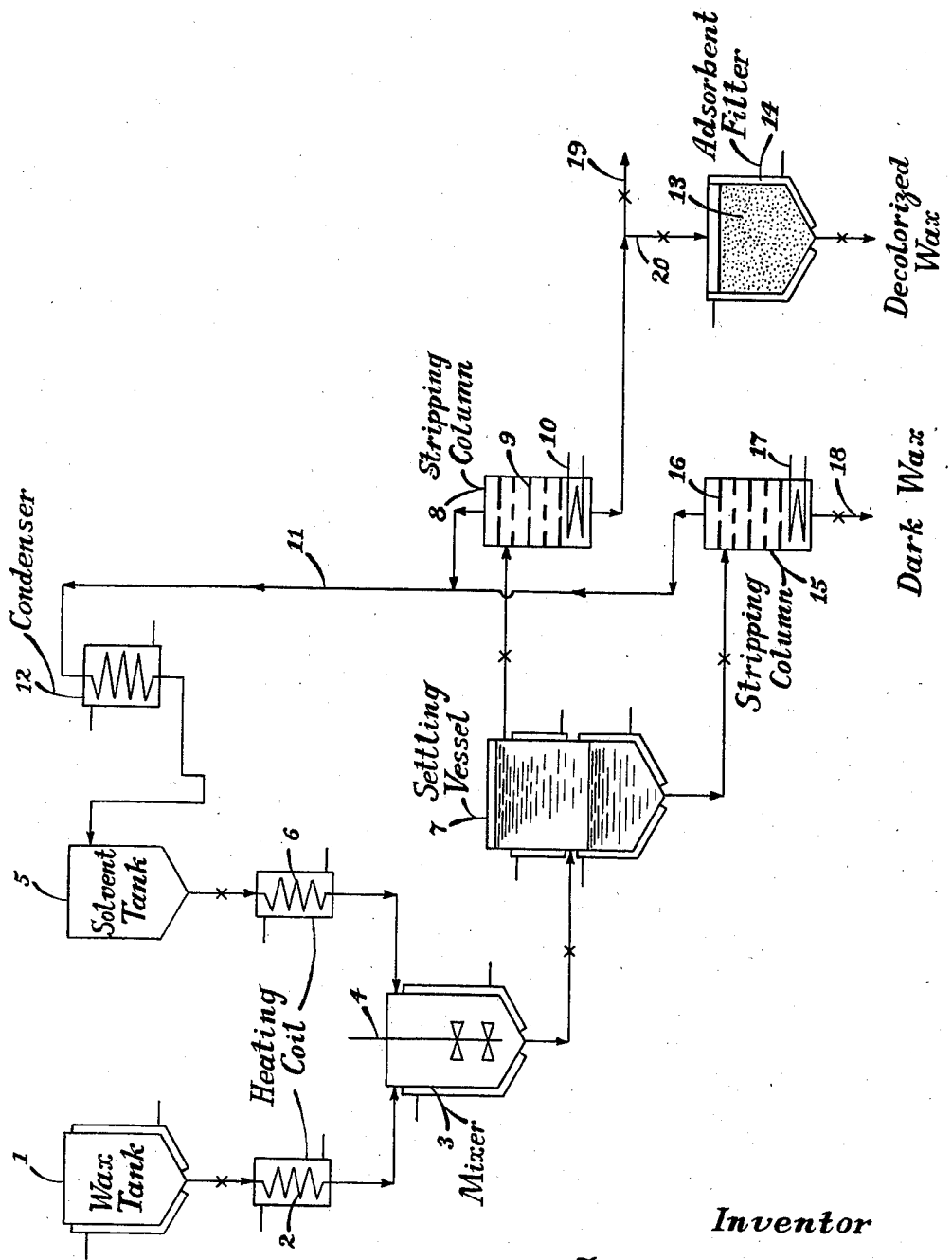
Inventor
Seymour W. Ferris
By J. Wallace Quinn
Attorney Patented Aug. 8, 1939

2,168,330

UNITED STATES PATENT OFFICE 2,168,330

PURIFICATION OF WAXES

Seymour W. Ferris, Aldan, Pa., assignor to The Atlantic Refining Company, Philadelphia, Pa., a corporation of Pennsylvania Application May 8, 1935, Serial No. 20,395

2 Claims. (Cl. 196—17)

The present invention relates to the purification of solid or semi-solid waxy substances, and more particularly to the decolorization of waxes derived from petroleum distillates and residues, and waxes produced by the destructive distillation and/or hydrogenation of coal, lignite, shale and the like.

An object of this invention is the production of light colored or white wax or wax fractions from crude or dark colored wax which is not amenable to treatment in accordance with conventional processes heretofore known and practiced by those skilled in the art.

A further object of this invention is the production of light colored or white wax or wax fractions having substantially the same melting point and refractive index as the initial wax stock undergoing treatment.

Hydrocarbon waxes such as those obtained from petroleum, and ozokerite, montan and ceresin waxes obtained during the distillation of coal, lignite, shale and the like, are more or less dark colored in the crude state. Heretofore various refining methods have been employed to remove impurities from the wax and to reduce the color thereof, which methods usually involved the use of acid and/or clay, the washing of the wax with various reagents, or the recrystallization of the wax from solvents.

I have found that from waxy substances, and particularly from petroleum waxes which cannot be satisfactorily treated by the conventional methods, there may be produced substantially white waxes by subjecting the crude or dark wax to treatment with a selective solvent whereby the crude wax is separated into two portions, one of which is relatively insoluble in the solvent and the other is soluble in the solvent, along with the bulk of the impurities and coloring matter. Upon subjecting the insoluble wax portion, after removal of traces of solvent therefrom, to treatment with fuller's earth or other decolorizing agent, a substantially white wax is obtained which has approximately the same melting point as the untreated crude wax. My process will produce substantially white waxes from wax stocks that contain color-imparting bodies which cannot be economically removed by conventional acid and/or clay treatment.

In accordance with my invention, I admix the wax to be treated with a suitable quantity of a selective solvent at such temperature that the wax is in a molten or fluid condition and may be either partially or completely miscible with the solvent. I then cool the admixture or solution to a temperature at which separation of the liquid into a two-layer system will take place, such temperature being, in all cases, sufficiently high to prevent crystallization of the wax. One layer will contain a relatively small quantity of the solvent dissolved in the purified wax, while the other layer will contain a portion of the wax, together with the bulk of the impurities and color-bodies, dissolved in the major portion of the solvent. After the extraction proper, I effect separation of the two layers which form, by any suitable procedure, as for example, by decantation. I then remove from each of the separated layers, that portion of the solvent which each contains, by suitable procedure, such as by vacuum or steam distillation, thereby to obtain two wax fractions, one of which has been substantially freed of impurities and the other containing the bulk of such impurities. Either or both of the wax fractions so produced may be filtered or contacted with a decolorizing agent such as fuller's earth, clay or other adsorptive agent whereby a white wax will be obtained from the solvent refined fraction, and a dark wax will be obtained from the extract wax fraction. In any case, the melting point and refractive index of the refined white wax will be approximately the same as that of the untreated wax stock, while the melting point of the dark or extract wax may be slightly lower than that of the untreated stock, such difference being due, in part, to the concentration of oil in the dark wax fraction by the extraction process.

My process may be carried out in either a batch or continuous system, and preferably in a continuous countercurrent system whereby greater economy in operation is obtained. Among the solvents or solvent mixtures which may be employed in accordance with my invention, the following are given as typical examples: nitrobenzene and other aromatic or aliphatic nitro compounds, phenol, chloro phenol, cresol, furfural, $\beta,\beta'$ dichloro ethyl ether, aniline, chloro aniline and various other selective solvents which are capable of selectively extracting the impurities and color-bodies from waxes. The selective solvents may be employed individually or in admixture with other substances which raise the miscibility temperature of the wax with the solvent and thereby permit my process to be utilized in the treatment of high melting point waxes. Thus, diethylene glycol, resorcinol, pyrogallol, maleic anhydride and the like, when added to a selective solvent raise the miscibility temperature and permit the extraction and separation of layers at higher temperatures than when the solvent alone is used.

My process is to be distinguished from processes involving the crystallization of wax from solvents to remove impurities and to produce wax fractions of different melting points, or processes in which solid or crystalline wax is washed with various solvents. My process is rather one of selectively removing impurities and color-bodies from the initial wax stock by solution, said process being carried out in such a manner as to effect separation of wax fractions as two liquid phases, whereby crystallization or solidification of the wax is avoided and a clean separation of the liquid phases may be effected. Such method of separation not only prevents contamination of the phases, one with the other, but also permits the separation of wax fractions having substantially the same melting point as the untreated wax stock.

In order to further illustrate my invention, reference is had to the accompanying drawing, which shows, diagrammatically, apparatus suitable for carrying out my process.

Substantially oil-free hydrocarbon wax containing color-bodies, which is not amenable to decolorization by conventional acid treating and/or clay treating methods, is passed from a steam-jacketed storage tank 1 through a heating coil 2 into a steam-jacketed mixing vessel 3, provided with stirrer 4, and a suitable quantity of a solvent, for example, nitrobenzene or a solvent mixture containing nitrobenzene, is passed from solvent storage tank 5 through a heating coil 6 and thence into mixing vessel 3. The wax and solvent are brought to an elevated temperature, which is at least as high as the melting point of the wax, and usually somewhat higher, by means of heating coils 2 and 6, respectively. The wax and solvent are thoroughly admixed in the steam-jacketed mixing vessel 3 at a temperature above the melting point of the wax, thereby to effect solution of a portion of the wax and most of the color-bodies in the solvent. The mixture of fluid, undissolved wax and solution containing dissolved wax and color-bodies is then passed into a steam jacketed settling vessel 7, wherein settling and stratification of the fluid, undissolved wax and solution containing dissolved wax and color-bodies is effected at a temperature above the melting point of the wax. The fluid, undissolved wax, being of lower specific gravity than the solution, forms an upper layer in the settling vessel 7, and the solution containing dissolved wax and color bodies forms the lower layer.

The upper layer comprising fluid, undissolved wax and a small amount of solvent is passed from the upper portion of settling vessel 7 into a stripping column 8 provided with baffles 9 and heating coil 10. In the stripping column 8, solvent is vaporized from the fluid wax passing downwardly over the baffles 9, the vaporized solvent being withdrawn from the top of column 8 and passed by means of vapor line 11 to condenser 12, wherein the vaporous solvent is cooled and condensed, and thereafter returned to solvent storage tank 5 for further use.

The fluid, undissolved wax, which has been freed of solvent in the stripping column 8, is withdrawn from the bottom thereof, and may be passed to storage (not shown) by means of line 19, or may be passed through line 20 into contact with a decolorizing adsorbent 13, such as fuller's earth or bauxite maintained at an elevated temperature in a jacketed vessel or filter 14. The wax which has been subjected to the action of the decolorizing adsorbent is withdrawn, in a fluid state, from the bottom of vessel 14 and may be passed to storage (not shown). This undissolved wax fraction, whether subjected to adsorbent decolorization, or not, has a melting point substantially the same as that of the initial wax charged to the treating process.

Referring now to the lower layer of solvent containing dissolved wax and color-bodies, such layer is withdrawn from the bottom of settling vessel 7 and passed into a stripping column 15, provided with baffles 16 and heating coil 17. In the stripping column, solvent is vaporized from the wax and color-bodies, the vaporized solvent being withdrawn from the top of column 15 and passed by means of vapor line 11 to condenser 12, wherein the vaporous solvent is cooled and condensed, and thereafter passed to the solvent storage tank 5 for further use. The mixture of wax and color-bodies, which has been freed of solvent in the stripping column 15, is withdrawn from the bottom thereof through valve-controlled line 18 and passed to storage (not shown). In the operation of either stripping column 8 or 15, open steam and/or reduced pressure may be employed to assist removal of solvent from the wax fractions.

While, in the process above described, separate mixing and settling vessels were employed, it is obvious that the solvent treatment at temperatures above the melting point of the wax may be carried on in one or more extraction towers, wherein a continuous countercurrent contacting of the wax and solvent may be effected.

My invention will be further understood from the following specific examples:

I. 100 parts by volume of wax obtained from an East Texas high viscosity lubricating oil distillate, said wax being substantially oil free and having a melting point of 132° F., and a refractive index of 1.4493, was admixed with 100 parts by volume of furfural and heated to about 203° F. The mixture was agitated and then allowed to settle at this temperature, whereupon a two-layer system was formed, one layer comprising the undissolved liquefied wax containing a small amount of solvent, and the other layer comprising the bulk of the solvent containing a portion of the wax contaminated with color-bodies. The layers were separated, the solvent was removed from each, and the undissolved wax fraction comprising 54.0% of the stock was filtered through a hot clay filter to give a yield of 3.7 tons of wax per ton of clay, of which 14.0% was a substantially white wax having a melting point of 132° F., and a refractive index of 1.4495.

II. 100 parts by volume of wax obtained from an East Texas intermediate viscosoity lubricating oil distillate, said wax having an oil content of 0.3%, a melting point of 154° F., and a refractive index of 1.4352, was admixed with 150 parts by volume of a solvent consisting of 60% nitrobenzene—40% aniline, and heated to a temperature in excess of 158° F. The mixture was agitated, then cooled and allowed to settle at about 158° F., whereupon a two-layer system was formed, one layer comprising the undissolved liquefied wax containing a small amount of solvent, and the other layer comprising the bulk of the solvent containing a portion of the wax contaminated with color bodies. The layers were separated, the solvent was removed from each, and the undissolved wax fraction comprising 88.7% of the stock was filtered through a hot clay filter to give a yield of 5.9 tons of wax per ton of clay, all of which was a substantially white wax having a melting point of 154° F., and a refractive index of 1.4357.

III. 100 parts by volume of wax obtained from an East Texas petrolatum stock, said wax having an oil content of 3.0%, a melting point of 148° F., and a refractive index of 1.4460, was admixed with 200 parts by volume of aniline and heated to about 203° F. The mixture was agitated and then allowed to settle at this temperature, whereupon a two-layer system was formed, one layer comprising the undissolved liquefied wax containing a small amount of solvent, and the other layer comprising the bulk of the solvent containing a portion of the wax contaminated with color-bodies. The layers were separated, the solvent was removed from each, and the undissolved wax fraction comprising 95.0% of the stock was filtered through a hot clay filter to give a yield of 6 tons of wax per ton of clay, of which 17.0% was a substantially white wax having a melting point of 149° F., and a refractive index of 1.4450.

IV. 100 parts by volume of wax obtained from an East Texas intermediate viscosity lubricating oil distillate, said wax having an oil content of 3.7%, a melting point of 118° F., and a refractive index of 1.4394, was admixed with 300 parts by volume of $\beta,\beta$ dichloro ethyl ether and heated to a temperature in excess of 131° F. The mixture was agitated, then cooled and allowed to settle at about 131° F., whereupon a two-layer system was formed, one layer comprising the undissolved liquefied wax containing a small amount of solvent, and the other layer comprising the bulk of the solvent containing a portion of the wax contaminated with color-bodies. The layers were separated, the solvent was removed from each, and the undissolved wax fraction comprising 72.8% of the stock was filtered through a hot clay filter to give a yield of 4.4 tons of wax per ton of clay, of which 22.4% was a substantially white wax having a melting point of 118° F., and a refractive index of 1.4387.

V. 100 parts by volume of wax obtained from an East Texas high viscosity lubricating oil distillate, said wax having an oil content of 0.8%, a melting point of 176° F., and a refractive index of 1.4419, was admixed with 100 parts by volume of a solvent consisting of 90% nitrobenzene—10% maleic anhydride and heated to a temperature in excess of 203° F. The mixture was agitated and then allowed to settle at about 203° F., whereupon a two-layer system was formed, one layer comprising the undissolved liquefied wax containing a small amount of solvent, and the other layer comprising the bulk of the solvent containing a portion of the wax contaminated with color-bodies. The layers were separated, the solvent was removed from each, and the undissolved wax fraction comprising 94.2% of the stock was filtered through a hot clay filter to give a yield of 1.75 tons of wax per ton of clay, of which 75.5% was a substantially white wax having a melting point of 177° F., and a refractive index of 1.4413.

My invention is particularly applicable to the refining of waxes which cannot be successfully treated with acid and/or clay, and while, in the examples above given, I have shown the treatment of wax stocks obtained from East Texas crude oil, I do not intend to limit myself thereto but may, in accordance with my invention, purify and decolorize waxes from sources other than East Texas crude oil.

In the appended claims, the term "nitrobenzene" is to be understood to comprehend nitrobenzene or mixtures of solvents containing substantial amounts of nitrobenzene.

What I claim is:

1. The process for producing light-colored wax fractions and dark-colored wax fractions from a substantially oil-free hydrocarbon wax containing color-bodies and which is not amenable to treatment for the removal of color bodies by the usual refining processes involving acid and clay treatment, which comprises bringing substantially oil-free hydrocarbon wax into intimate contact with nitrobenzene in sufficient amount and at a temperature above the melting point of said wax such as will effect formation of two liquid phases, one comprising undissolved wax of substantially the same melting point as the initial hydrocarbon wax and the other comprising nitrobenzene containing dissolved wax and color-bodies, separating the liquid phases so formed at a temperature above the melting point of the initial hydrocarbon wax, and removing nitrobenzene therefrom.

2. The process for producing light-colored wax fractions and dark-colored wax fractions from a substantially oil-free hydrocarbon wax containing color-bodies and which is not amenable to treatment for the removal of color bodies by the usual refining processes involving acid and clay treatment, which comprises bringing said substantially oil-free hydrocarbon wax into intimate contact with nitrobenzene in sufficient amount and at a temperature above the melting point of said wax such as will effect formation of two liquid phases, one comprising undissolved wax of substantially the same melting point as the initial hydrocarbon wax and the other comprising nitrobenzene containing dissolved wax and color-bodies, separating the liquid phases so formed at a temperature above the melting point of the initial hydrocarbon wax, removing nitrobenzene therefrom, and contacting the undissolved wax fraction with a decolorizing adsorbent.

SEYMOUR W. FERRIS.